(12) United States Patent
Zhou et al.

(10) Patent No.: US 8,731,110 B1
(45) Date of Patent: May 20, 2014

(54) CONTINUITY OF FUNCTION OF A GPS RECEIVER DURING POWER CYCLING

(75) Inventors: Hao Zhou, Mountain View, CA (US); Aku-Matti T. Levola, Tampere (FI)

(73) Assignee: QUALCOMM Incorporated, San Diego, CA (US)

( * ) Notice: Subject to any disclaimer, the term of this patent is extended or adjusted under 35 U.S.C. 154(b) by 272 days.

(21) Appl. No.: 13/032,452

(22) Filed: Feb. 22, 2011

Related U.S. Application Data

(60) Provisional application No. 61/354,159, filed on Jun. 11, 2010.

(51) Int. Cl.
*H03K 9/00* (2006.01)
(52) U.S. Cl.
USPC .......... 375/316; 375/142; 375/150; 701/32.4; 701/412; 701/468
(58) Field of Classification Search
None
See application file for complete search history.

(56) References Cited

U.S. PATENT DOCUMENTS

| | | | |
|---|---|---|---|
| 2010/0103038 A1* | 4/2010 | Yeh et al. | 342/357.12 |
| 2010/0171659 A1 | 7/2010 | Waters et al. | |
| 2011/0117272 A1* | 5/2011 | Nielsen et al. | 427/137 |
| 2012/0295563 A1* | 11/2012 | Baba | 455/226.1 |
| 2012/0313817 A1* | 12/2012 | Underbrink et al. | 342/357.72 |

* cited by examiner

*Primary Examiner* — Adolf Dsouza
(74) *Attorney, Agent, or Firm* — Mahamedi Paradice Kreisman LLP

(57) ABSTRACT

A GPS receiver includes an RF section and a digital section, the digital section including a correlator circuit for performing correlation with respect to a plurality of satellite channels. The GPS receiver is operated by cycling power to the RF section on and off according to a determined duty cycle having an ON portion and an OFF portion. During the ON portion, navigation related data received from the plurality of satellite channels is sampled by higher level software. Continuity of function may be achieved by resetting a state of at least a portion of the correlator circuit in correspondence to a transition from the OFF portion to the ON portion.

9 Claims, 14 Drawing Sheets

CONTINUITY OF FUNCTION OF A GPS RECEIVER DURING POWER CYCLING

RELATED APPLICATIONS

This application claims benefit of U.S. provisional patent application Ser. No. 61/354,159 filed on Jun. 11, 2010, incorporated herein by reference.

BACKGROUND

The present application relates to satellite navigation receivers, e.g., Global Positioning System (GPS) receivers.

GPS receivers are well-known as exemplified by U.S. Pat. No. 7,705,778 of the present assignee, entitled SATELLITE NAVIGATION RECEIVER HAVING CONFIGURABLE ACQUSITION AND TRACKING ENGINES, incorporated herein by reference; also by the AR1520 GPS receiver chip sold by the present assignee. Acquisition and tracking of satellite (also referred to as space vehicle) signals by a GPS receiver requires considerable signal processing and data processing activity and hence consumes considerable power. For mobile applications and pedestrian use, low power operation of a GPS receiver is desirable in order to prolong battery life. The present application addresses this need.

SUMMARY

The present application, generally speaking, relates to a GPS receiver and a method of operating a GPS receiver. The GPS receiver may include an RF section and a digital section, the digital section including a correlator circuit for performing correlation with respect to a plurality of satellite channels. The GPS receiver is operated by cycling power to the RF section on and off according to a determined duty cycle having an ON portion and an OFF portion to conserve power. During the ON portion, navigation related data received from the plurality of satellite channels is sampled by higher-level software. Accuracy may be increased by sampling the data nearer to an ending time of the ON portion than to a beginning time of the ON portion. Continuity of function may be achieved by resetting a state of at least a portion of the correlator circuit in correspondence to a transition from the OFF portion to the ON portion. Resetting the state of at least a portion of the correlator may include determining a state of the portion of the correlator circuit that would have been expected at a point in time following the OFF portion, and resetting the state of the portion of the correlator circuit to a state based on the state that would have been expected. To further conserve power, at least some data processing may be ceased during the OFF portion and resumed during the ON portion. Ceasing data processing may include disabling bit extraction and message processing, for example. Resuming data processing may include resetting time-of-week data to account for the OFF portion.

The data processing section may include one or more data processing FIFOs, in which case the data processing FIFOs may be flushed in correspondence with an OFF portion. Bits of selected words within the data processing FIFO may be set to identify them as lost words that do not contain valid data. If the data processing section includes one or more parity error counters, the parity error counters may be reset in correspondence with an OFF portion.

In other embodiments, GPS tracking may follow a task computing model. A task may be defined in accordance with appropriate parameters, for example, starting time, satellite ID, computing period, possibly antenna ID, etc. A scheduler or operation system may manage the tasks to run adaptively to achieve desired goals.

DRAWING FIGURES

DETAILED DESCRIPTION

Figure 1:
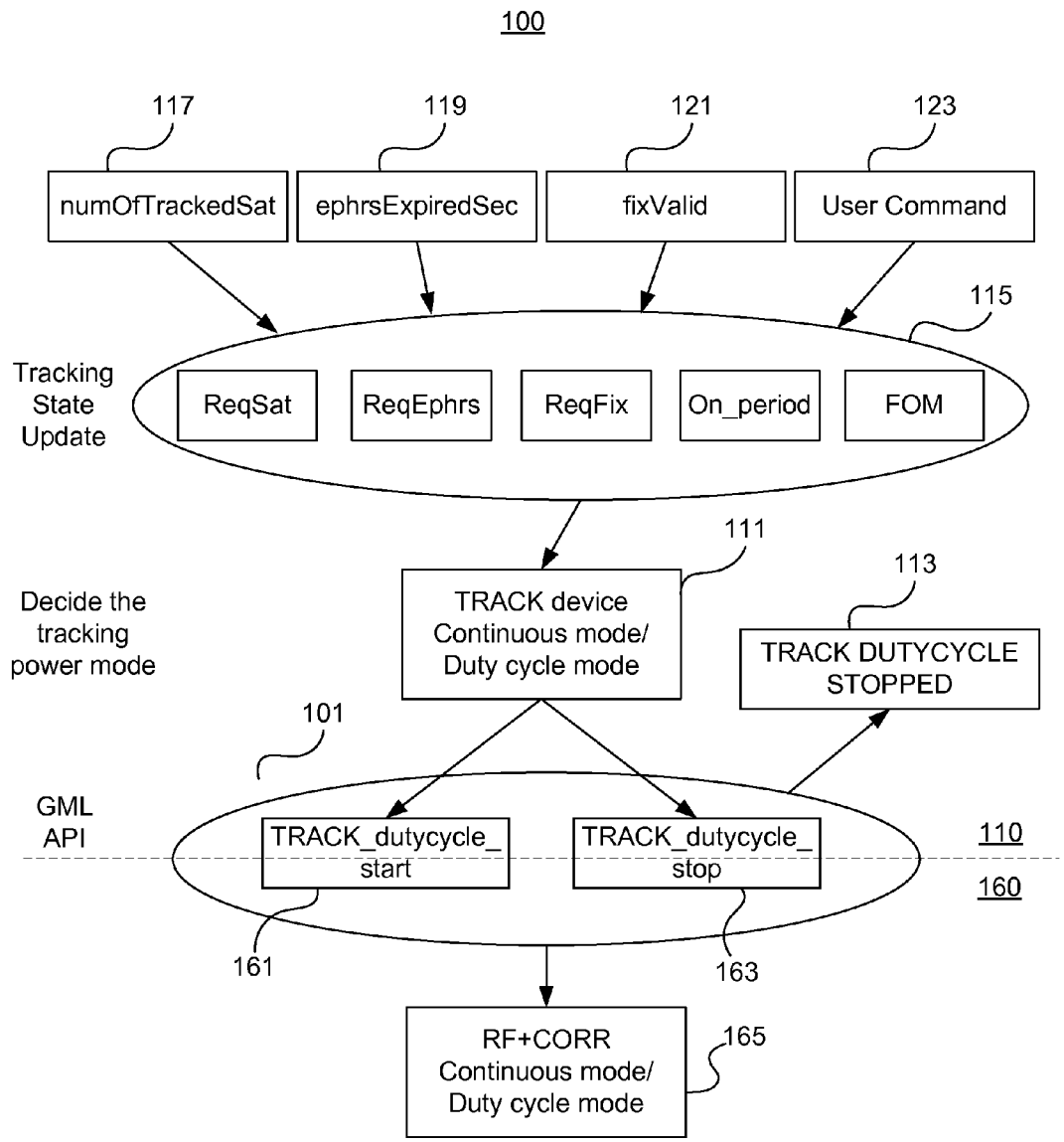
FIG. 1 depicts selected software/firmware of a GPS receiver.

Those of ordinary skill in the art will realize that the following detailed description of embodiments in this specification is illustrative only, and is not intended to be in any way limiting. Other embodiments will readily suggest themselves to such skilled persons having the benefit of this disclosure. It will be apparent to one skilled in the art that these specific details may not be required to practice the embodiments. In other instances, well-known devices are shown in block diagram form to avoid obscuring the present application. In the following description of the embodiments, substantially the same parts are denoted by the same reference numerals.

Power consumption of a GPS receiver may be reduced by allowing the GPS receiver to enter a low power mode when certain operational constraints are met. In one embodiment, the low power mode may be realized by duty cycling (alternatively powering on and off) one or more portions of the GPS receiver. As referred to herein, a continuous mode describes a power mode wherein the GPS receiver operates at relatively full power and a duty cycle mode describes a power mode wherein one or more portions of the GPS receiver may be duty cycled. By reviewing operational constraints, an overall balance between reduced power consumption and GPS receiver performance may be met extending the battery life of mobile GPS receivers.

Referring now to FIG. 1, there is shown selected software/firmware 100 of a GPS receiver. Higher-level routines 110 are separated from lower-level routines 160 that control the hardware of a GPS receiver. The higher-level routines 110 invoke the lower-level routines 160 by way of an Application Program Interface (API) 101. Within the higher-level routines 110, a track construct 111 (track device) selects a tracking power mode from among a continuous mode and a duty cycle mode. In the case of duty cycle mode, the track construct 111 sends an API call TRACK_duty_cycle_start 161 to the low-level routines 160 to enter duty cycle mode and sends an API call TRACK_duty_cycle_stop 163 to return from duty cycle mode to continuous mode. When low-level operations have been completed in order to return from duty cycle mode to continuous mode, the API 101 returns a message 113 to the higher level routines 110 that the duty cycle mode has been stopped. The low-level routines 160 control to what extent power is supplied to the RF section of the GPS receiver and the correlator circuitry of the GPS receiver as indicated by block 165. During duty cycle mode, the low-level routines 160 cycle power to these subsystems in order to conserve power. Note that any or all of the elements of FIG. 1 may be implemented in software/firmware, in hardware, or in some combination thereof.

A tracking state update routine 115 is responsive to various inputs to update the track construct 111 with up-to-date state information to enable it to decide the tracking power mode, either continuous mode or duty cycle mode. Inputs to the tracking status update routine 115 include, in one embodiment, the number of satellites being tracked (numOfTracked-Sat 117), the time until ephemeris information expiration for each satellite (ephrsExpiredSec 119), an indication that the position fix for the most recent one-second interval is valid (fixValid 121), and user input calling for full power or specific power operation (User Command 123). In response to these inputs, the tracking status update routine 115 generates control signals to the low-level routines 160 that will control duty cycle tracking. In one embodiment, these control signals may include the following:

TABLE 1

| ReqSat 125 | Requires more satellites |
|---|---|
| ReqEphrs 127 | Requires ephemeris information for the tracked satellites |
| ReqFix 129 | Requires valid fix |
| On_period 131 | User specified on period |

In another embodiment, the tracking state update routine 115 may also respond to satellite almanac data to update the track construct 111. When a satellite almanac has been acquired, the GPS receiver may "predict" when one or more satellites may become visible. Thus, the GPS receiver may operate in duty cycle mode until new satellites become visible and then operate in continuous mode.

In yet another embodiment, the tracking state update routine 115 may also respond data available from alternate GPS satellite constellations. A GPS receiver may be able to acquire and track GPS satellites from two or more GPS systems such as, but not limited to, GLONASS (Russia), Beidou (China), GPS (USA) and Galileo (EU) systems. Such GPS receivers may use a first GPS system to provide a primary location solution and may augment the location solution with a second GPS system. The tracking state update routine 115 may determine that the second GPS system may have data that may be downloaded. In this case, the tracking state update routine 115 may select continuous mode.

The tracking state update 115 may also respond to Figures of Merit (FOM). In one embodiment, a FOM may be a figure that describes a quality such as reliability of a tracking loop. The tracking loop is a portion of a GPS receiver that may track the position, via pseudo-ranges, of a GPS satellite. The FOM may also be influenced by a signal to noise ratio of a GPS satellite signal and determined dynamic stress. Dynamic stress may be caused by relatively high amounts of dynamic acceleration or other motion components of the GPS receiver. Relatively greater amounts of dynamic stress may increase the difficulty of tracking a GPS satellite.

The FOMs of all tracked satellites may be examined and compared to a threshold. In one embodiment, if the FOMs of a predetermined number of tracked satellites fall below the threshold, the tracking state update routine 115 may change from duty cycle mode to continuous mode.

In one embodiment, the low-level routines 160 enable duty cycle mode only if there are no requirements for more satellites, ephemeris information, or a valid fix, and if any user-specified on period is less than a full period (i.e., full power). During duty cycle mode, tracking loops operate only partially in time but keep providing valid track measurements.

In one embodiment, the on/off status of various GPS receiver elements in duty cycle mode and in full power (continuous) mode is as follows:

TABLE 2

| Mode | TCXO | Radio | Search | Corr | CPU | Usage of Mod |
|---|---|---|---|---|---|---|
| 1 | On | Off | Off | Off | On | Power-down receive path. CPU is running for post-processing |
| 2 | On | On | On | On | On | Full power mode with continuous tracking |

In the foregoing table, "Search" refers to search circuitry and "Corr" refers to correlation circuitry.

Assuming a 500 ms period, an acceptable power-on duration will vary depending on satellite signal strength (CN0) and signal dynamic resulting from relative motion between the satellite and the user and from user clock drift. Acceptable power-on duration may range from, for example, 40 ms to 200 ms. In one embodiment, basic power-on durations may be specified for a 10 Hz/sec dynamic and a 30 Hz/sec dynamic as follows:

TABLE 3

|  | CN0 < 20 dB-Hz | CN0 >= 20 dB-Hz | CN0 >= 24 dB-Hz | CN0 >= 30 dB-Hz |
|---|---|---|---|---|
| 10 Hz/sec | 500 ms | 180 ms | 80 ms | 40 ms |
| 30 Hz/sec | 500 ms | 500 ms | 200 ms | 100 ms |

Figure 2:
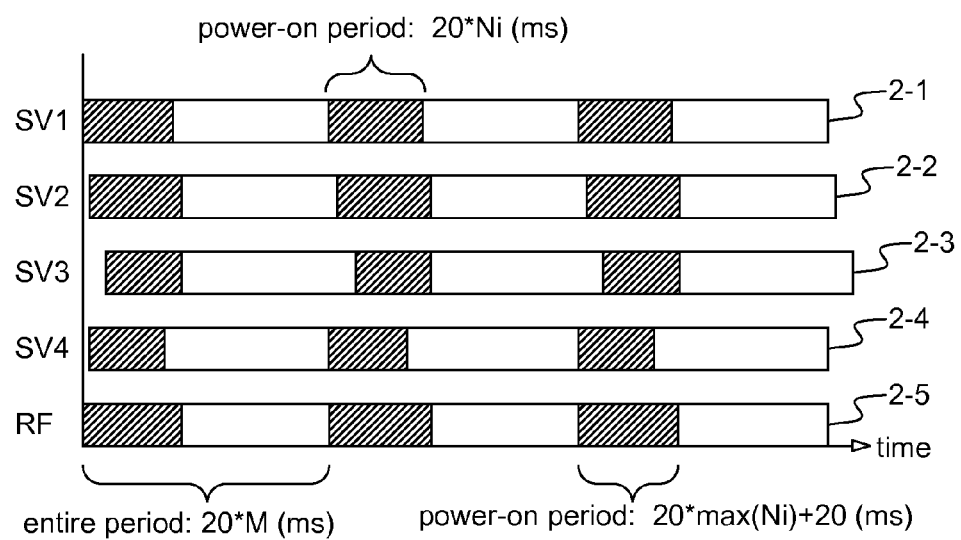
FIG. 2 is a timing diagram illustrating power cycling.

The chosen duty cycle should ultimately be the same for all satellites and therefore is chosen to accommodate the worst-case satellite, as illustrated in FIG. 2. The granularity chosen for controlling the duty cycle may be 20 ms, for example. The power-on duration of the RF section, shown in waveform 2-5 of FIG. 2, may be chosen to be the required power-on duration (measured in 20 ms intervals) of the worst-case satellite of the satellites SV1-SV4, plus an additional 20 ms. During the ON portion of the duty cycle, data is sampled from the plurality of received satellite channels Preferably, the data is sampled nearer to an ending time of the ON portion than to a beginning time of the ON portion to allow for settling and to thereby achieve greater accuracy.

In another embodiment, the chosen duty cycle may be determined, in part, by a GPS signal property such as a dilution of precision (DOP) number. As is well-known, the DOP number may be a figure of merit describing, among other things, the accuracy of a current GPS solution (position and time). For example, if the DOP number indicates a relatively accurate GPS solution, then the ON portion of the duty cycle may be less frequent. On the other hand, if the DOP number indicates a relatively inaccurate GPS solution, then the ON portion of the duty cycle may be more frequent. In yet another embodiment, a weighted DOP figure of merit may be used to affect the duty cycle. For example, the DOP figure may be weighted by one or more signal quality estimates.

To determine an overall combined duty cycle, duty cycles for each of the individual satellites may first be determined in accordance with signal properties and with bit boundary timing. Then, an overall combined duty cycle (waveform 2-5) may be determined having an ON portion that encompasses the ON portions for all of the individual satellites. In one exemplary embodiment, the ON portion of waveform 2-5 begins at the beginning of a 500 ms period. Note how the ON portion of the duty cycles of the individual satellites, illustrated in waveforms 2-1 to 2-4, have beginning and ending times that are different, typically, from the beginning and ending time of the ON portion of the overall combined duty cycle, on account of different bit boundary timings and different signal properties.

In the example of FIG. 2, the satellites SV1-SV4 are referred to herein as tracked satellites, corresponding satellites channels being referred to as tracked channels. "Tracking" refers to a channel state when a carrier frequency and a code phase of a particular satellite signal are synchronized and their values together with a decoded frame message provide a valid pseudo range (PR) estimation.

Further details of one implementation of how power may be cycled in accordance with the requirements described are described herein.

During power cycling, certain otherwise continuous operations of the GPS receiver hardware may be disrupted. To ensure continuous functioning of the GPS receiver, e.g., providing a valid fix each second, steps may need to be taken to compensate for such disruptions. Disruptions may occur, for example, in operation of the correlation circuitry, data processing circuitry, etc.

In one embodiment, an epoch counter TME is briefly and temporarily masked in the course of transitioning between the ON and OFF portions of a power duty cycle, resulting in TME counting loss. However, a master clock MCLK remains active, enabling TME loss to be measured and compensated for. By determining a state of the portion of the correlator circuit that would have been expected at a point in time following the OFF portion if the OFF portion had been zero, and resetting the state of the portion of the correlator circuit to a state based on the state that would have been expected, continuity of function of the correlator circuit may be achieved.

Furthermore, in one embodiment, operation of one or more data processing FIFOs and of one or more parity counters are disrupted in the course of transitioning between the ON and OFF portions of a power duty cycle. Steps may be taken before and after such transitions in order to ensure continuity of function. Such steps may include disabling bit extraction and message processing, for example. Resuming data processing may include resetting time-of-week data to account for the OFF portion. In the case of the data processing FIFOs, the FIFOs may be flushed in correspondence with an OFF portion. Bits of selected words within the data processing FIFOs may be set to identify them as lost words that do not contain valid data. If the data processing section includes one or more parity error counters, the parity error counters may be reset in correspondence with an OFF portion. Following the OFF portion, bit extraction and message processing may be re-enabled.

Figure 3:
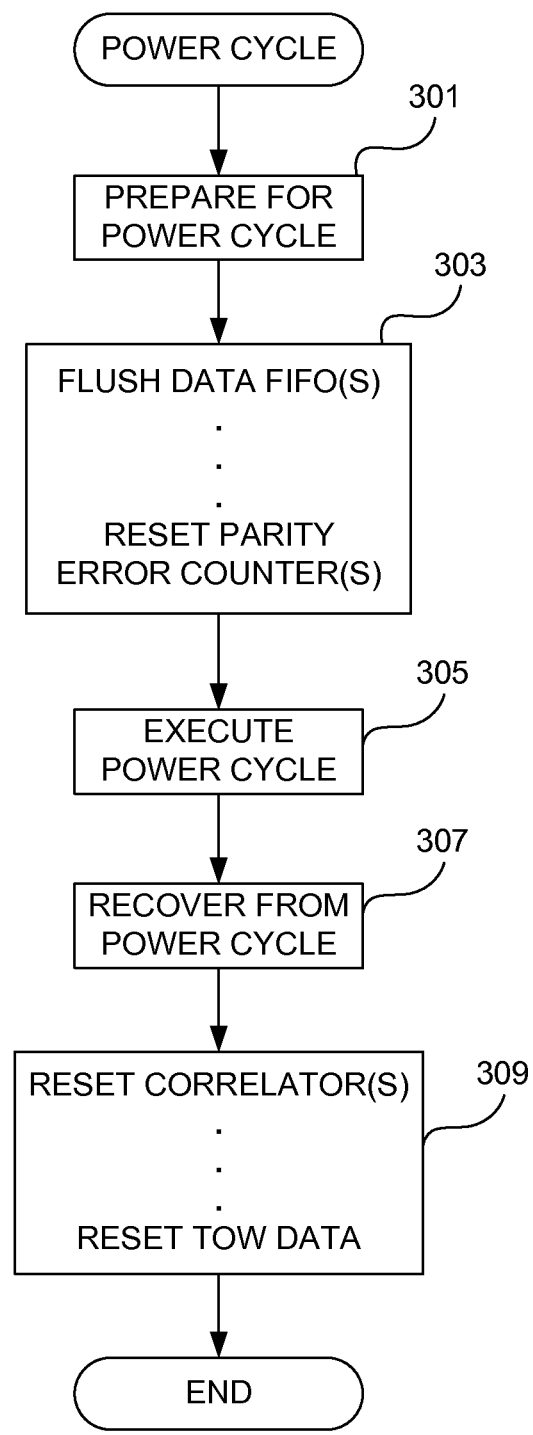
FIG. 3 is a flow chart illustrating power cycling.

Referring to FIG. 3, a flow chart is shown illustrating power cycling. In step 301, preparations are made for power cycling, i.e., transitioning from an ON portion of the power duty cycle to the OFF portion. Such preparations (step 303) may include, for example, flushing data FIFOs, resetting parity error counters, etc., as described. The power cycle is then executed (step 305). In step 307, actions are taken to recover from power cycling. Such actions (step 309) may include, for example, resetting correlators, resetting TOW data, etc., as described.

Figure 4:
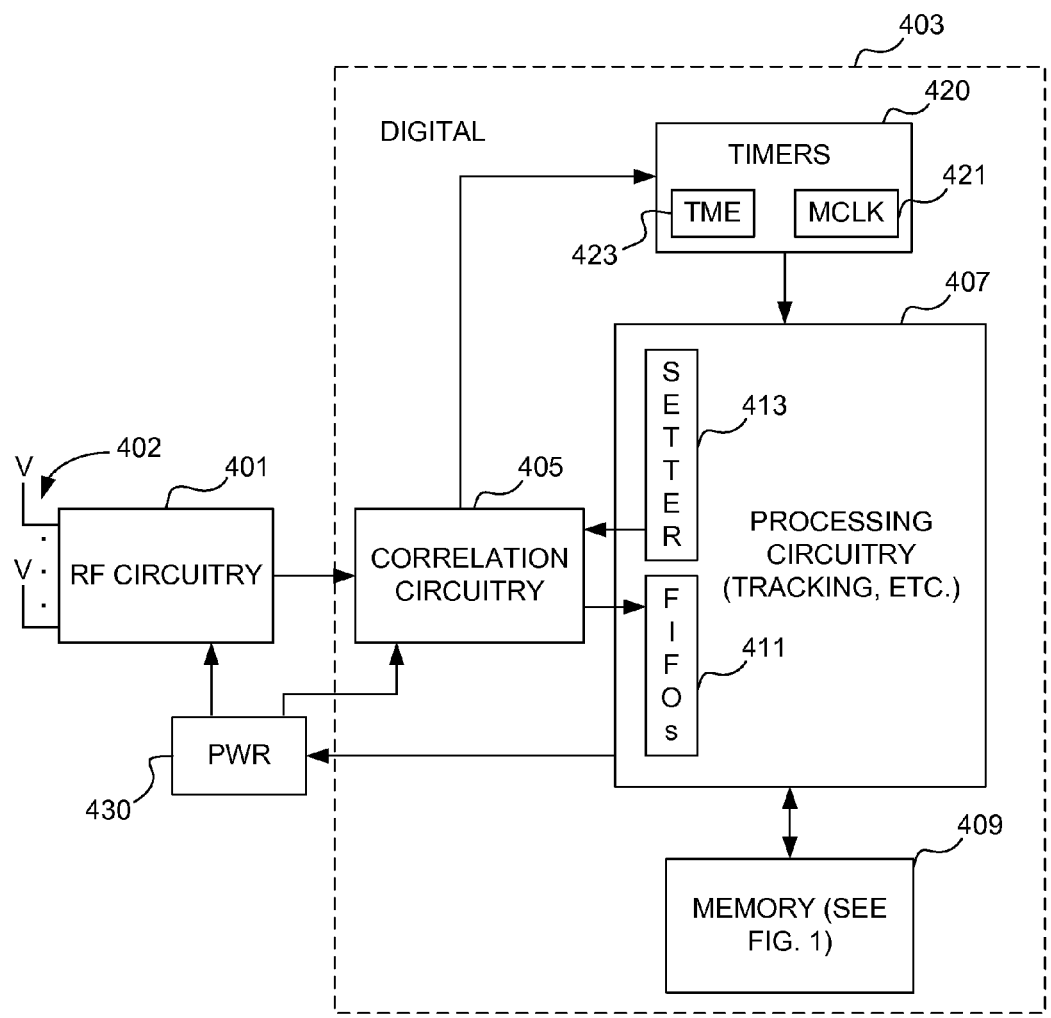
FIG. 4 is a diagram of GPS receiver hardware.

Referring to FIG. 4, a block diagram is shown of a GPS receiver in accordance with one exemplary embodiment. RF circuitry 401 is coupled to digital circuitry 403 that may include correlation circuitry 405 and processing circuitry 407 that may perform tracking and other functions. The RF circuitry 401 may be provided with one or more antennas 402. The processing circuitry may be coupled to memory 409, which may store program instructions that implement the software/firmware routines of FIG. 1, for example. The processing circuitry 407 may include FIFOs 411 coupled to the correlation circuitry as previously described. The processing circuitry 407 may also include a setter mechanism 413 coupled to the correlation circuitry 405, as described in greater detail herein.

A clock/timer block 420 is coupled to the processing circuitry 407 and may include various clocks and timers. In an exemplary embodiment, a master clock MCLK 421 is provided, as well as an epoch timer TME 423.

A power management block 430 is coupled to the processing circuitry 407, the correlation circuitry 405 and the RF circuitry 401. In an exemplary embodiment, the power management block 430 supplies power to the RF circuitry 401 and the correlation circuitry 405 under control of the processing circuitry 407 so as to implement a continuous power mode and a duty cycle power mode.

In one embodiment, control logic is provided to control two aspects of duty cycle operation: power control and loop control. Power control refers to operations closely related to the actual power-up or power-down state of hardware subsystems. Loop control refers to the control of loop (frequency locked loop and code delay locked loop) update operations that make use of receiver outputs in order to provide valid carrier frequency and code phase tracking.

Figure 6A:
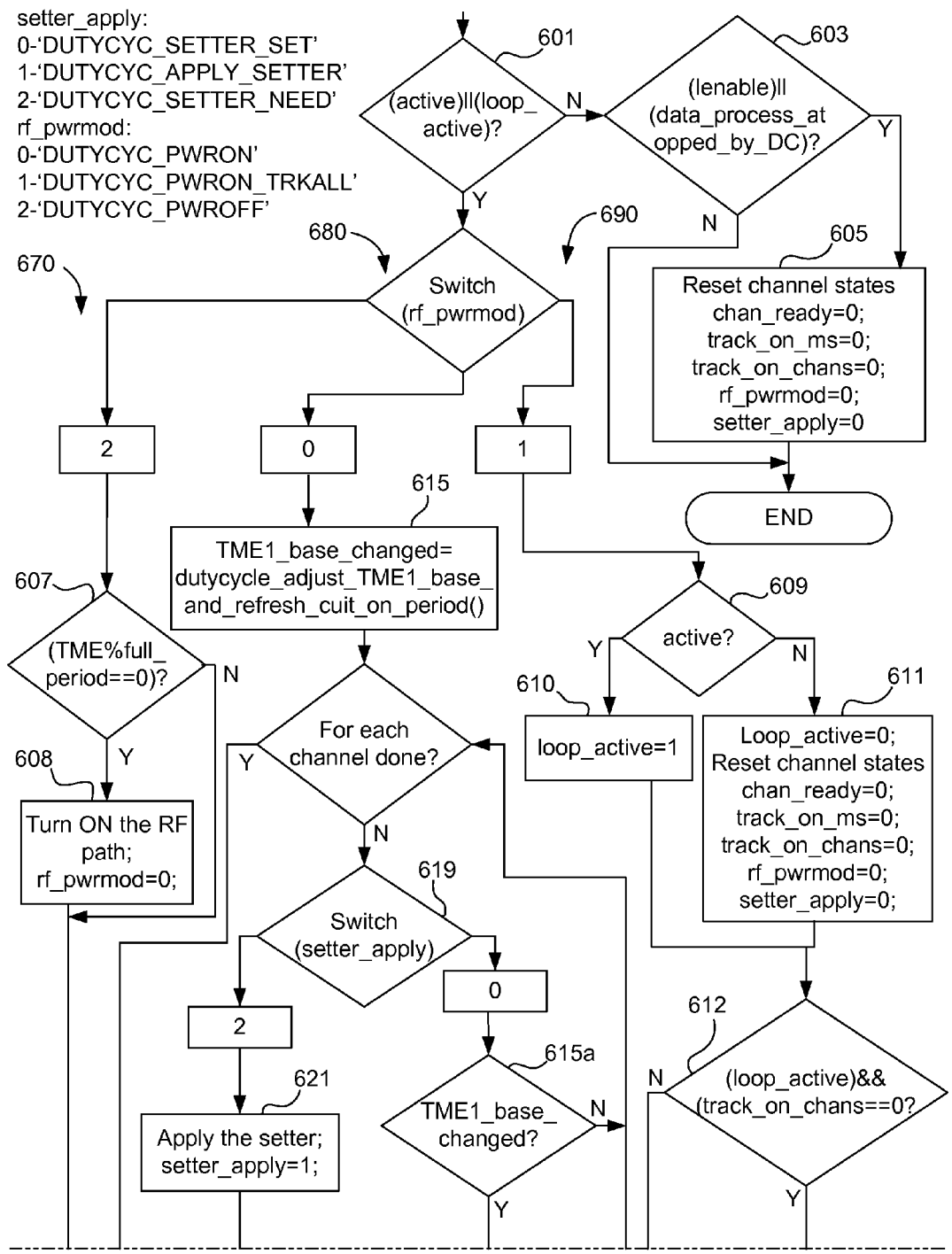
FIG. 6a and FIG. 6b are flowcharts illustrating duty cycle power control.
Figure 6B:
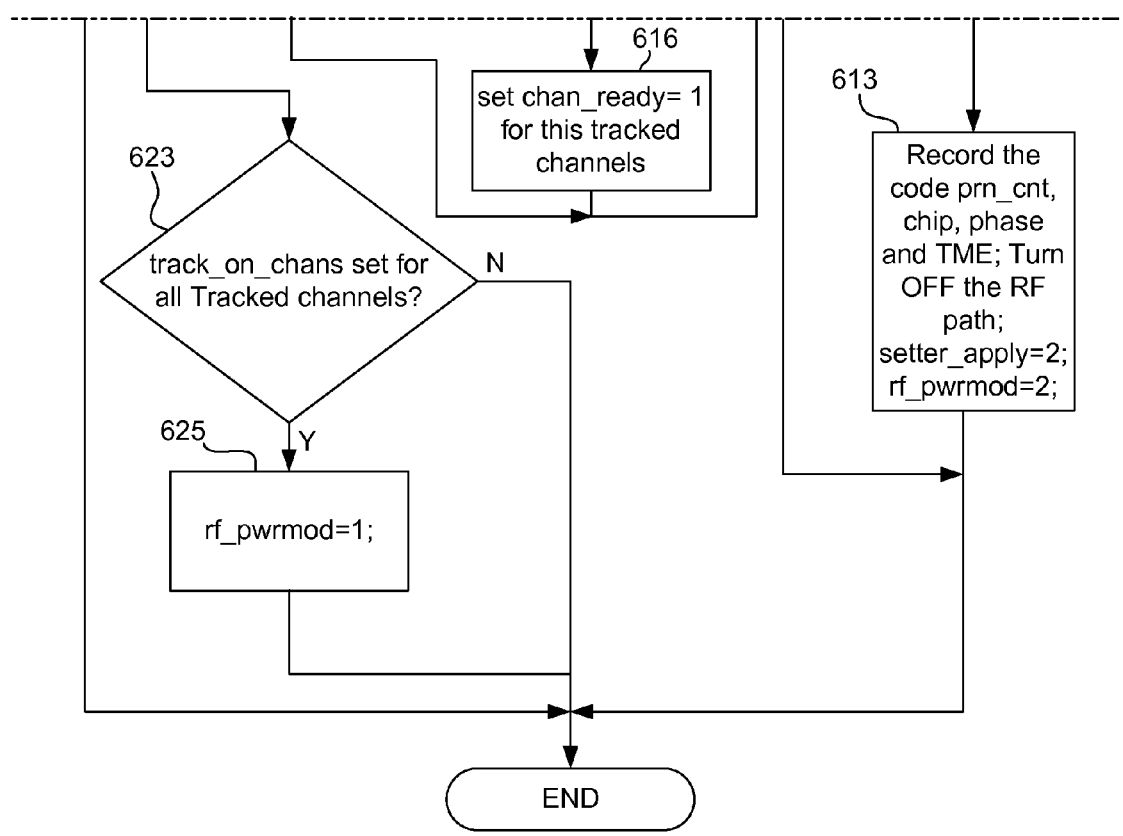

Duty cycle power control logic flow will first be described. Referring to FIG. 6a and FIG. 6b, two sets of states are defined. A set of states named rf_powermod are defined according to the following Table:

TABLE 4

| rf_powermod | |
| --- | --- |
| 0 | 'DUTYCYC_PWRON' |
| 1 | 'DUTYCYC_PWRON_TRKALL' |
| 2 | 'DUTYCYC_PWROFF' |

In state 0, power has been turned ON, e.g., following conclusion of an OFF portion of the duty cycle. In state 1, a duty-cycle-tracking power-on condition exists. In this state, the current portion of the duty cycle is the ON portion, and tracking is performed with respect to all of the active satellites. In state 2, the current portion of the duty cycle is the OFF portion.

A set of states named setter_apply are defined according to the following Table:

TABLE 5

| setter_apply | |
|---|---|
| 0 | 'DUTYCYC_SETTER_SET' |
| 1 | 'DUTYCYC_APPLY_SETTER' |
| 2 | 'DUTYCYC_SETTER_NEED' |

In many known GPS receivers, a setter mechanism is used to set the hardware state of the correlator circuitry. In state 0, settings have taken effect in hardware. In state 1, settings have been conveyed to the setter mechanism and have not yet taken effect in hardware but will take effect after a delay. In state 2, there is a need to convey settings for a particular channel to the setter mechanism.

In general, the duty cycle task, in one exemplary embodiment, may be described by conditions "active" and "loop_active." "Active" refers to whether or not duty cycle operation is active. It may be an explicit flag reflecting the user latest duty cycle command. "Loop_active" refers to a sub-condition of "active" in which all of the available channels have entered the duty-cycle power ON duration (FIG. 2). It may be an internal flag that indicates the current duty cycle operation mode. In step 601 of FIG. 6a, first, a check is made whether either an "active" or "loop_active" condition currently exists.

If not, step 603 determines if duty cycling is not enabled and data processing has been stopped due to duty cycling (for example, duty cycling may be stopped by the user just after duty cycling processing has started). If not enabled and data processing has been stopped, then step 605 initializes variables so that continuous mode can be resumed and then the method ends. On the other hand, if duty cycling is enabled or data processing has not stopped, then the method ends directly.

Assuming an "active" or "loop_active" condition does currently exist (step 601), then operation follows one of three different branches of logic including a left branch 670, a middle branch 680, or a right branch 690, according to the current state of rf_powermod.

The left branch 670 it taken when rf_powermod=2 (DUTYCYC_PWROFF). In this branch, a determination is made when a full duty-cycle period has expired (step 607), whereupon (step 608) power to the RF path of the GPS receiver is turned ON, and the rf_pwrmod state is switched from 2 to 0 (DUTYCYC_PWRON), coincident with the start of a new period. If the full duty-cycle period has not expired (step 607), then no action is taken and the routine returns.

The right branch 690 it taken when rf_powermod=1 (DUTYCYC_PWRON_TRKALL). Preliminarily, a check is made (step 609) whether duty cycle operation remains active or has been inactivated. If duty cycle operation remains active, then loop_active is set to 1 (step 610). Otherwise (step 611), loop_active is set to 0, and various channel states are reset, including the following:

TABLE 6

| Channel States | |
|---|---|
| chan_ready | 0 ('DUTYCYC_LOOP_READY'): the loop is checking the bit boundary for the particular satellite; the duty cycle is not ON until the bit boundary for that satellite is encountered. |

TABLE 6-continued

| Channel States | |
|---|---|
| | 1: ('DUTYCYC_LOOP_COUNT_ON'): the loop is in the duty-cycle ON period; the loop ON counter 'track_on_ms' increases by one every millisecond. |
| | 2: ('DUTYCYC_LOOP_COUNT_OFF'): the loop has completed the duty-cycle ON period; the duty-cycle OFF period is currently in effect. |
| track_on_ms | the lloop ON counter of the duty cycle for this channel in milliseconds |
| track_on_chans | each bit is mapped to one channel. The bit is set when its 'track_on_ms' is non-zero, i.e., the channel is at the duty cycle 'ON' duration. |
| rf_powermod | Per Table 4 |
| setter_apply | Per Table 5 |

In a main portion of the right branch 690, a determination is made (step 612) whether the overall ON duty cycle, being the union of the ON duty cycles of the tracked channels, is complete as indicated by track_on_chans being 0 for all channels. In step 612, if track_on_chans is logic 0 for all channels (and if loop_active is set), then in the following step 613 current correlator states for all tracked channels are recorded for computing the correlator 'wake-up' state after the duty cycle 'OFF' duration. The RF path is turned OFF, and the state rf_pwrmod is set to 2 (DUTYCYC_PWROFF). Prior to power being turned back on, the correlator state will need to be set properly for each channel. Consequently, the setter_apply state for each channel transitions to 2 (DUTYCYC_SETTER_NEED).

In the middle branch 680 (followed if rf_pwrmod=2), setter processing is performed for each tracked channel, preparatory for when power is reapplied following the OFF portion of a power cycle. Hence, in the middle branch 680, the hardware state of the correlator circuitry is set preparatory to power being reapplied (in the left branch 670) following completion of a power cycle.

In some systems, higher level software or firmware may be permitted to change a user measurement instant, for example to allow for faster fix after a sufficient number of satellites have been acquired. In one exemplary embodiment, higher level software may make a call 'TRACK_adjust_meas_phase' to carry out a measurement instant change. This possibility is accounted for in steps 615 and 615a of FIG. 6a, in which case the duty-cycle ON/OFF phase will be adjusted accordingly.

Assuming no measurement instant change, then for each tracked channel, if setter processing is needed (setter_apply=2, step 619), then setter processing is performed for that channel and the channel state is changed to so indicate (setter_apply=1, step 621). After a delay, the setter settings will have taken effect, and setter_apply will be set to logic 0. As a result, during a next pass through the Switch logic (step 619), chan_ready will be set to logic 1 for the particular tracked channel.

Figure 5A:
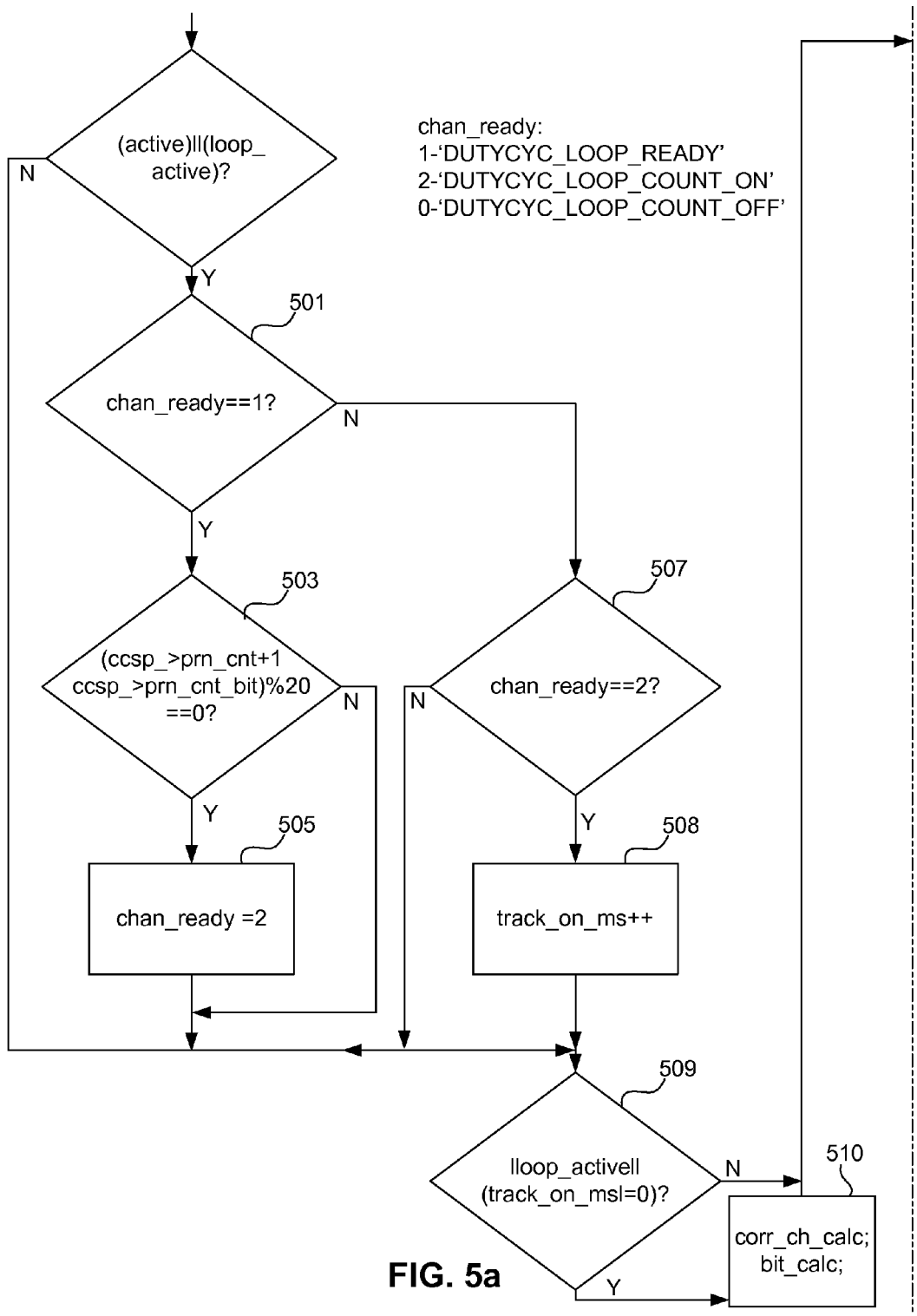
FIG. 5a and FIG. 5b are flowcharts illustrating duty cycle tracking logic.
Figure 5B:
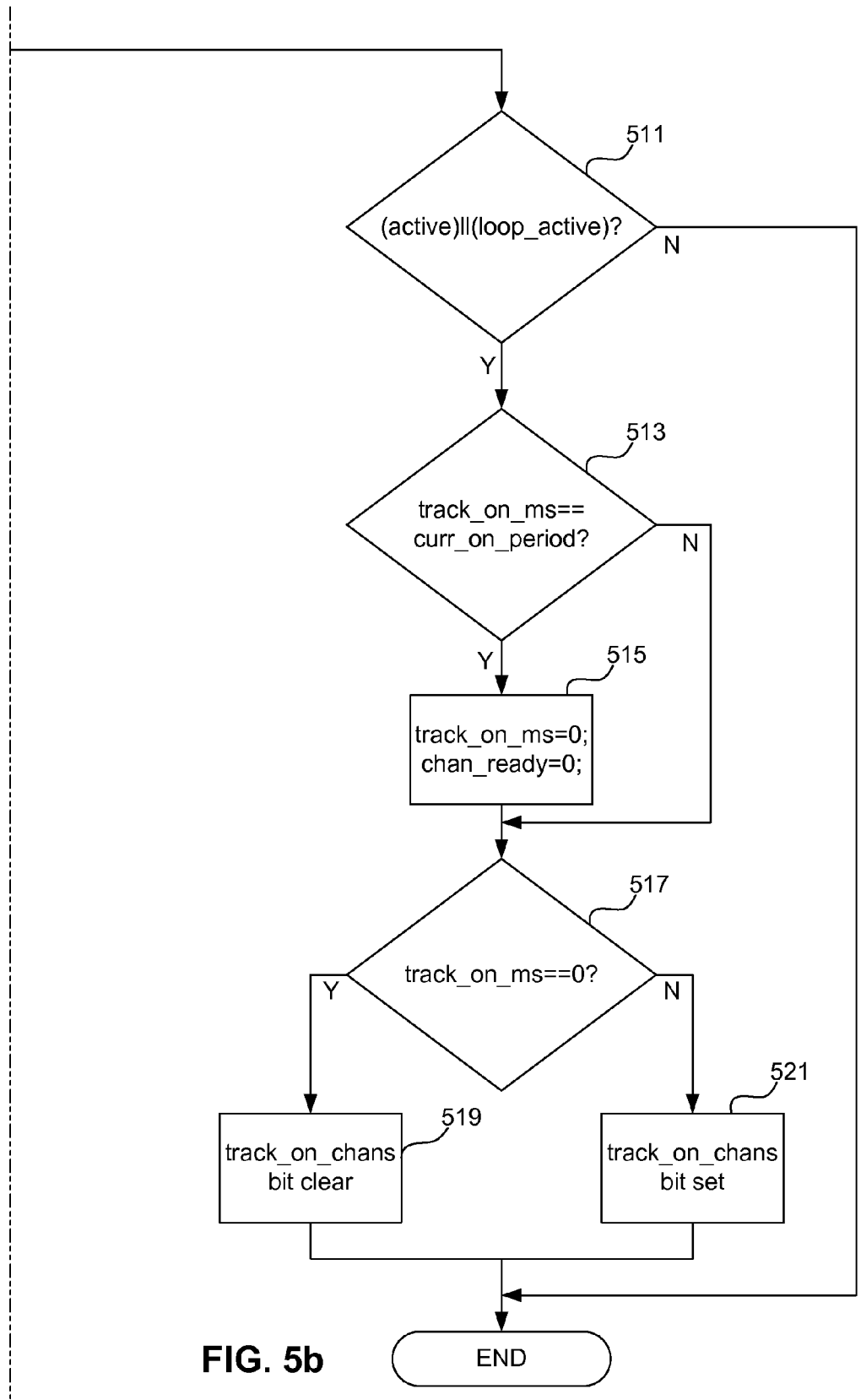

When setter processing has been performed for all channels (step 616), then in steps 623 and 625, a loop is traversed until the bit boundary (FIG. 2) has been hit for all tracked channels (to be described in greater detail in relation to FIG. 5a and FIG. 5b). This condition is indicated by the status bit track_on_chans being set for all tracked channels. The RF power mode is then changed from 0 (DUTYCYC_PWRON) to 1 (DUTYCYC_PWRON_TRKALL).

Figure 9:
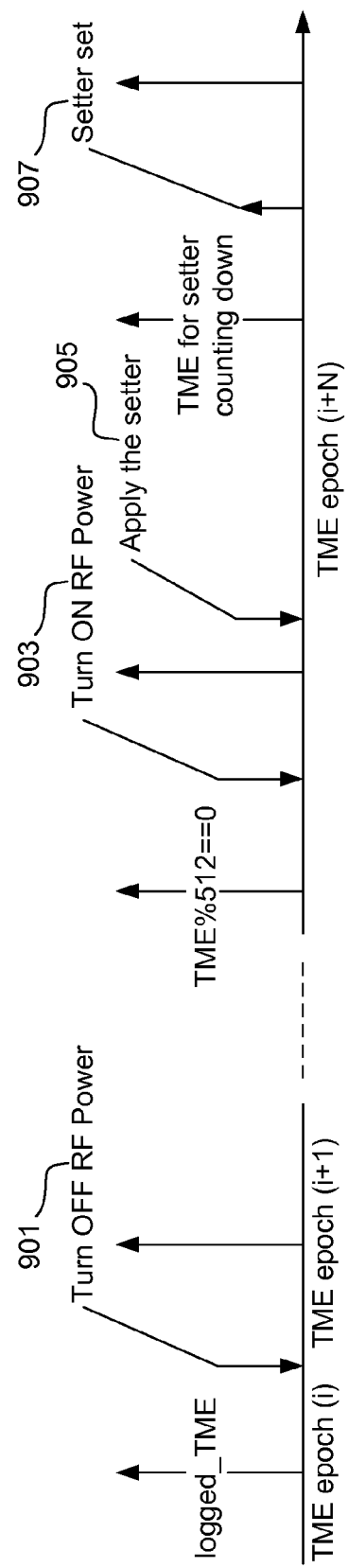
FIG. 9 is a timing diagram illustrating setter operation for achieving continuity of operation of correlation circuitry across power cycles.
Figure 10:
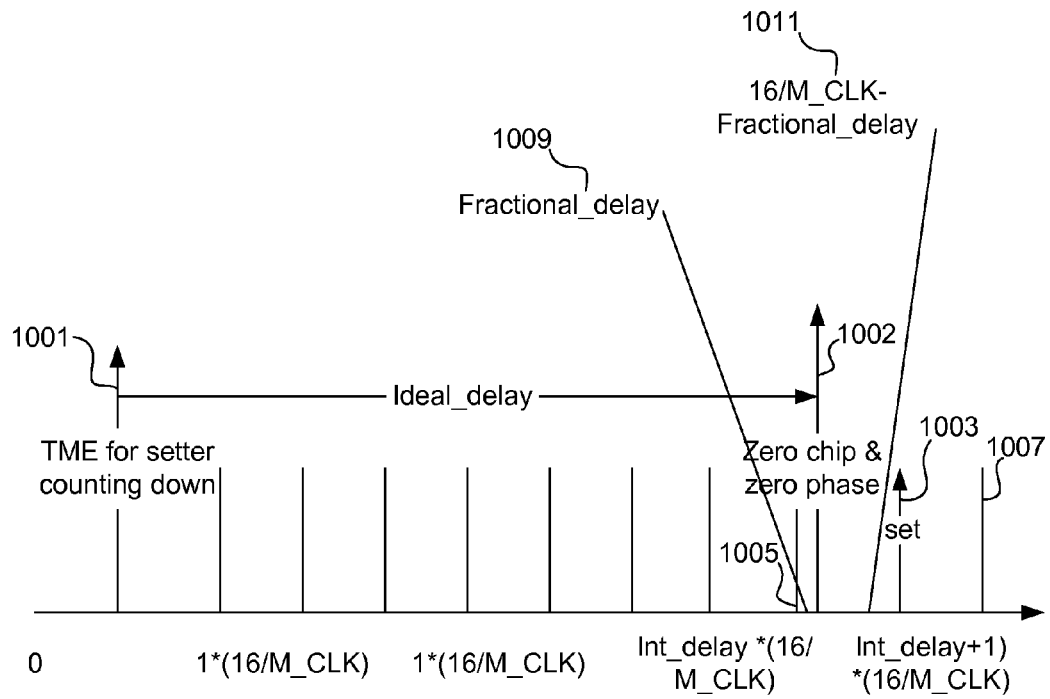
FIG. 10 is a timing diagram illustrating setter operation in greater detail.

Further details concerning operation of the setter mechanism in accordance with one illustrative embodiment are shown in FIG. 9 and FIG. 10.

In FIG. 9, a portion of a power cycle surrounding a transition thereof (TME %500=0) is shown. RF power is shown as being turned OFF earlier in the cycle at a time 901 between time instants marked by TME epoch (i) and TME epoch (i+1). Following TME %500=0, RF power is turned on at a time 903. Some settling time is required. One TME period is allowed for this purpose. During a next TME period, the setter is applied at a time 905, meaning that values are applied to correlator registers. However, actual operation using these values is held up until a following TME cycle pulse, shown as TME epoch (i+N). A time instant for commencing operation of the correlator using the setter values is counted down (in terms of M clock, or master clock, pulses) from the occurrence of TME epoch (i+N) and occurs at a time 907.

Details concerning how the M clock count may be properly determined in accordance with one exemplary embodiment are illustrated in FIG. 10. As set forth in greater detail in Appendix 1, the following two-step process may be used to ensure that the correlator resumes operation with the proper state for achieving, with considerable precision, continuity of operation:

Step 1: compute the ideal delay after N TME periods for which the chip phase output (PRN_CHIP_PHASE) of the correlator is expected to be equal to zero.

Step 2: modify the ideal delay to arrive at practical setter hardware settings.

Referring to FIG. 10, in one exemplary embodiment, setter settings may be applied coincident with a TME pulse 1001, and counting down may begin in accordance with the M clock until a point in time 1003 when the setter settings are set, meaning that operation of the correlator in accordance with the setter settings begins. This period may be measured coarsely in accordance with intervals of 16 M clocks and measured more finely in accordance with individual M clock pulses in the vicinity of when the setter settings are set (1003).

More particularly, in the illustrated exemplary embodiment, operation in accordance with the setter settings actually begins at a point in time 1003 coinciding with a 16M_CLK clock pulse following the ideal time 1002 (the precise point in time at which zero chip count and zero phase would have occurred). The clock period of the 16M_CLK clock straddles the ideal delay. The 16M_CLK pulse preceding the ideal delay is identified in FIG. 10 as 1005, and the 16M_CLK pulse following the ideal delay is identified in FIG. 10 as 1007. The portion of the 16M_CLK period that precedes the instant of the ideal time 1002 is identified as the fractional delay 1009. The portion of the 16M_CLK period that follows the instant of the ideal time 1002 is identified as '16M_CLK—fractional delay,' identified by reference numeral 1011. The fractional delay 1009 between the ideal time 1002 and the preceding 16M_CLK pulse may be compensated for, for example, in number-control oscillator (NCO) hardware settings as described in Appendix 1.

Figure 12:
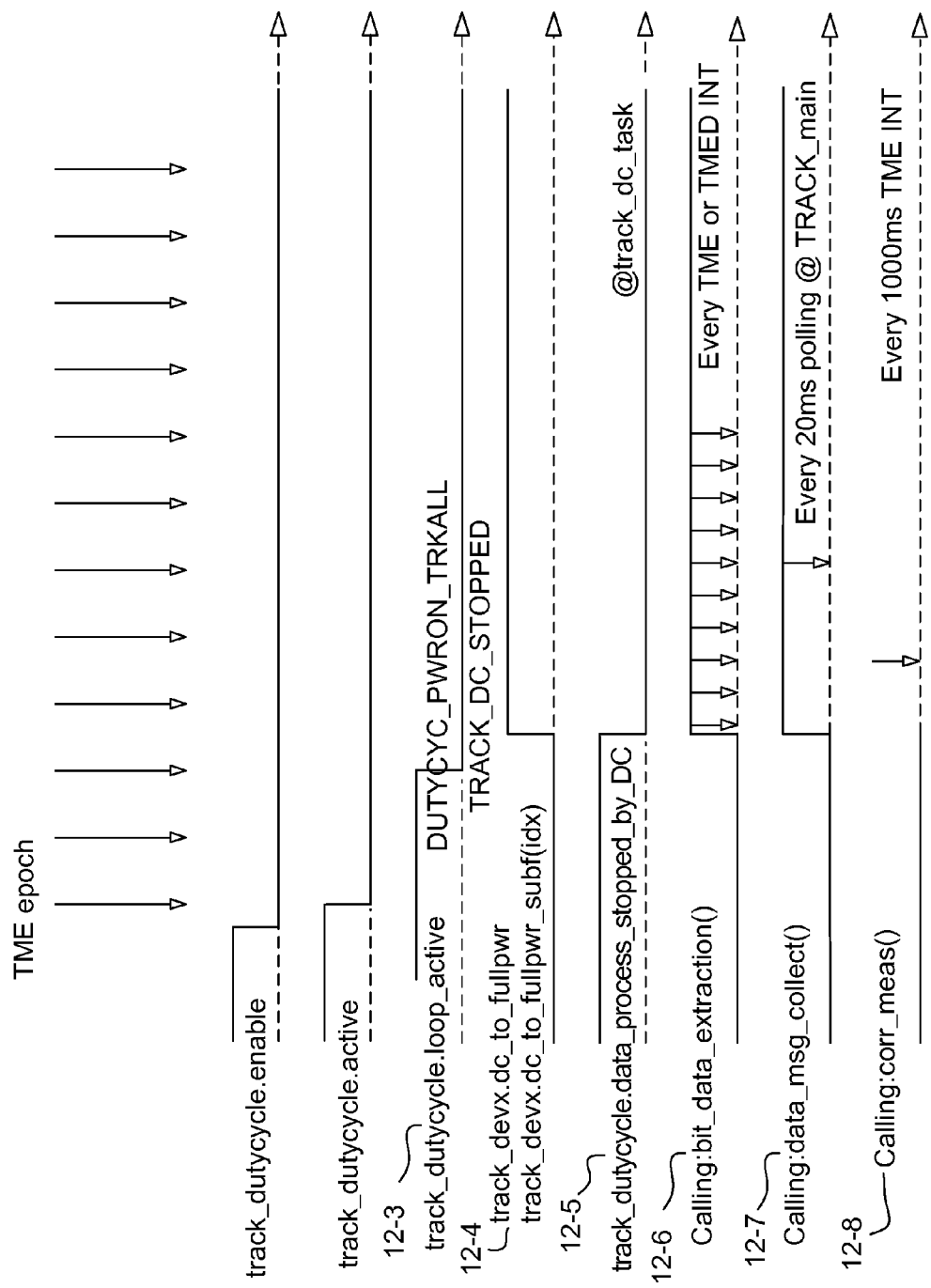
FIG. 12 is a timing diagram illustrating the resumption of data processing following an OFF portion of a power duty cycle.

FIG. 12 illustrates, in accordance with one exemplary embodiment, the resumption of data processing following the transition from the OFF portion of a duty cycle to the ON portion. (Although particular names of calls or procedures may be shown, such names are unimportant and are shown merely to illustrate the sequence of events, which may be clearly understood.) Waveform 10-3 shows a transition from the DUTYCYC_PWRON_TRKALL state to a DUTYCYC_PWRON state. As shown in waveforms 12-4 and 12-5, at a higher software level, this transition causes calls within a task (track_dc_task) that reflect a return to a full power state (waveform 12-4) and the end of a state in which data processing is stopped because of duty cycle control (waveform 12-5). Waveforms 12-6, 12-7 and 12-8 illustrate the resumption of bit decoding (waveform 12-6), bit assembly (waveform 12-7) and correlator measurement (waveform 12-8). In one exemplary embodiment, bit extraction may occur in accordance with the TME clock, bit assembly in accordance with a 20 ms polling cycle, and correlator measurement in accordance with a 1000 ms interrupt cycle.

FIG. 5a and FIG. 5b illustrate duty cycle loop control in accordance with one exemplary embodiment. This routine may be called, for example, for each effective satellite C/A code rollover interrupt. Two main tasks are performed: aligning the combined ON duty cycle with bit boundaries of the tracked satellites (FIG. 2); and counting a duration of the ON portion of the duty cycle to determine when to switch from the ON portion of the duty cycle to the OFF portion of the duty cycle. The alignment function is performed in steps 501, 503 and 505 on the left-hand side of FIG. 5a. The counting function is performed in steps 507 and 508 on of FIG. 5a, and processing related to completion of the ON portion of the duty cycle is performed in steps 511, 513, 515, 517, 519 and 521 on FIG. 5b. Depending on which portion of the duty cycle is occurring, ON or OFF, loop update operations that use correlator results (step 510) are performed (ON) or not performed (OFF).

Referring particularly to the left-hand portion of FIG. 5a, in step 501, if chan_ready equals 1, meaning that the bit boundary (FIG. 2) has not yet been registered, then a further check is performed in step 503 to see whether the bit boundary has occurred. If so, chan_ready is set to 2 (step 505). The next time the routine is executed, chan_ready is determined at step 507 to be equal to 2 with the result that an ON timer track_on_ms (a terminal count of which is set according to signal quality considerations as described herein) is incremented (step 508). If the ON portion of the duty cycle is presently occurring (step 509), then loop update processing is performed (step 510); otherwise; loop update operations are bypassed.

Turning attention to FIG. 5b, in step 511, a check is made to see whether the track_on_ms counter has reached its terminal count of curr_on_period. If so, then the counter is reset to zero and chan_ready is also reset, indicating a DUTYCYC_LOOP_COUNT_OFF state (step 513). In steps 519 and 521, a state variable track_on_chans is managed which is used to indicate whether or not all of the tracked channels are in a channel_ready state. If the counter, track_on_ms is zero (step 517), then track_on_chans is cleared (step 519). Otherwise, track_on_chans is set (step 521).

Figure 7:
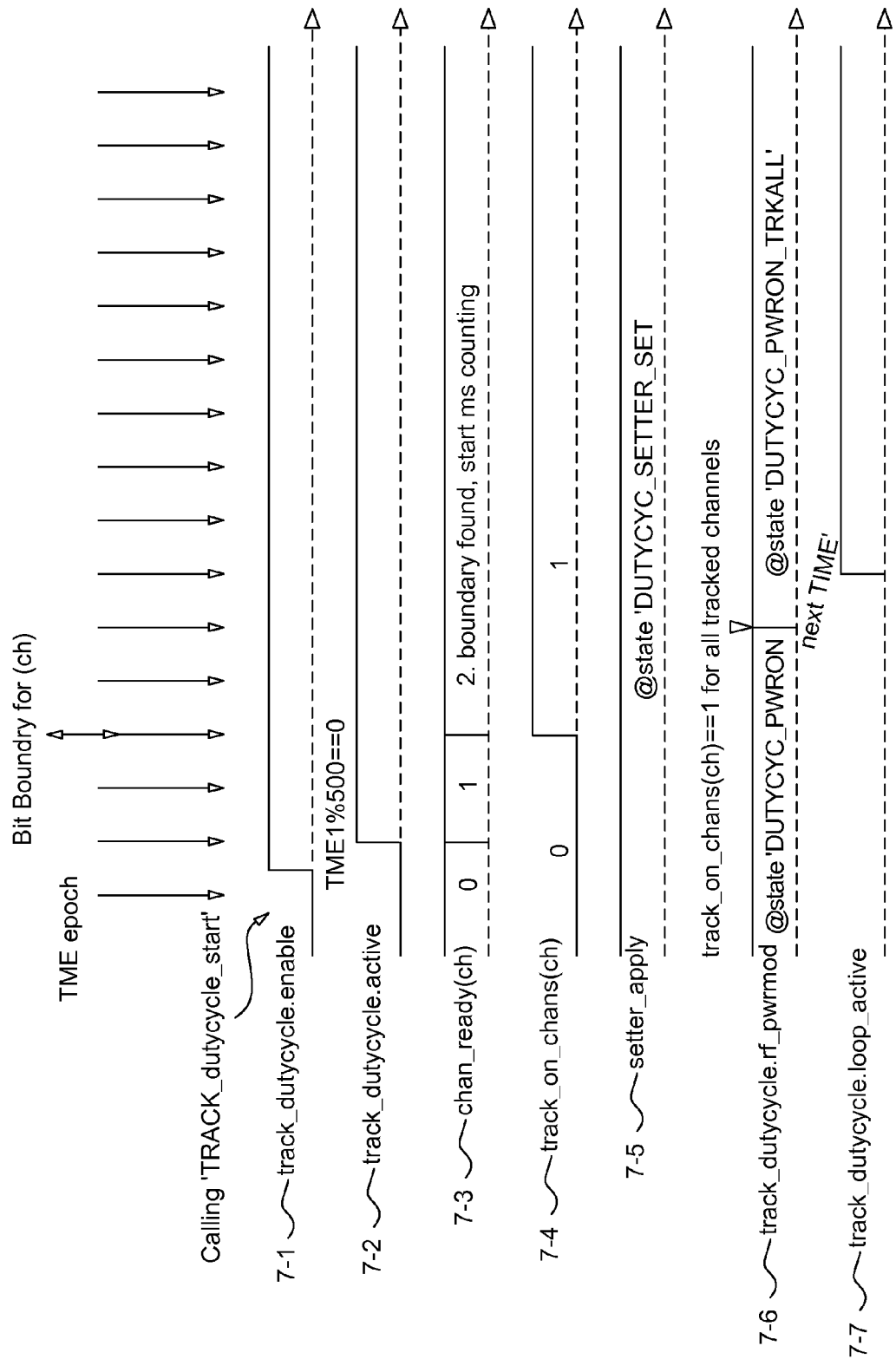
FIG. 7 is a timing diagram illustrating initiation of duty cycle operation.

Referring to FIG. 7, a timing diagram is shown illustrating the initiation of duty cycle tracking. In one exemplary embodiment, a function track_dutycycle_start is called and a track_dutycycle_enable variable is set to 1 (waveform 7-1). When TME %500=0, a variable track_dutycycle_active is set to 1, marking the beginning of the ON portion of the duty cycle (waveform 7-2). For each tracked channel, a chan_ready variable is kept (waveform 7-3). It is zero prior to duty cycle tracking becoming active and is set to 1 when duty cycle tracking become active. When the bit boundary for that channel is found, it is set to 2, and millisecond counting begins for purposes of timing the ON portion of the duty cycle.

When the bit boundary has been found for all tracked channels, such that chan_ready=2 for all tracked channels, then track_on_chans is set to 1 (waveform 7-4), and the RF power mode transitions from an ON state DUTYCYC_PWRON to a track-all state DUTYCYC_PWRON_TRKALL (waveform 7-6). At a next TME epoch occurrence, a variable track_dutycycle_loop_active is set to 1 (waveform 7-7). As a result, loop update processing is performed in step 510 during execution of the operations of FIG. 5a.

Figure 8:
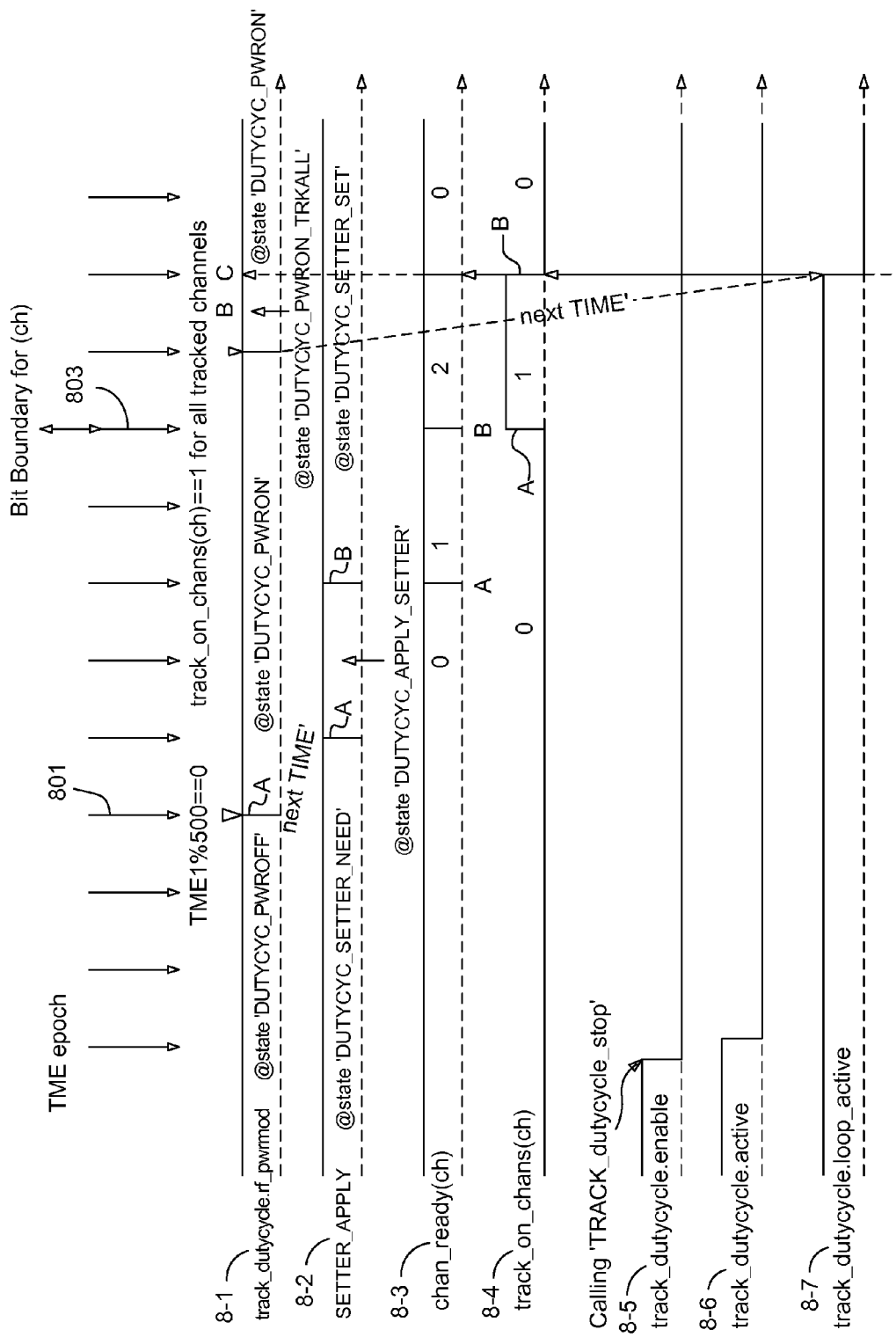
FIG. 8 is a timing diagram illustrating cessation of duty cycle operation.

Referring to FIG. 8, a timing diagram is shown illustrating the cessation of duty cycle tracking. In one exemplary embodiment, a call to a TRACK_dutycycle_stop routine may be called at any time by higher-level software/firmware. In response, a track_dutycycle_enable variable transitions low (waveform 8-7), and in turn, a track_dutycycle_active variable transitions low (waveform 8-6). A track_dutycycle_loop_active variable remains high, however, until a current duty cycle is completed (waveform 8-5).

In the example of FIG. 8, at the occurrence of the TRACK_dutycycle_stop call, the RF power mode is in a DUTYCYC_PWROFF state, and the state of the setter_apply state variable is DUTYCYC_SETTER_NEED. When TME %500 is found to be equal to zero at 801, the RF power mode transitions to DUTYCYC_PWRON (A, waveform 8-1), and at the next TME epoch time setter_apply transitions to DUTYCYC_APPLY_SETTER (A, waveform 8-2). After a delay, the setter becomes set, and at the next TME epoch time setter_apply transitions to DUTYCYC_SETTER_SET (B, waveform 8-2). The variable chan_ready becomes logic 1 (A, waveform 8-3). At a time 803, the bit boundary is encountered for a channel, assumed here to be the last bit boundary for the tracked channels. The variable chan_ready becomes logic 2 (B, waveform 8-3), and the variable track_on_chans becomes logic 1 (A, waveform 8-4). At a next TME pulse, track_on_chans is found to be logic 1 for all tracked channels. Hence, the RF power mode transitions to DUTYCYC_PWRON_TRKALL (B, waveform 8-1). At this point in time, the hardware state is such that the RF power mode may be set to DUTYCYC_POWERON (C, waveform 8-1) and state variable may be set accordingly. The duty cycle tracking mode has then been exited.

In accordance with the description of exemplary embodiments thus far, duty cycle coordination is performed for multiple tracked satellites.

Duty-cycling demonstrates that it is often sufficient, especially in the case of a strong signal with low dynamic, to maintain tracking using only a small portion of the signal. Hence, in other embodiments, correlator hardware may be timeshared on a demand-scheduled basis. For example, GPS tracking may follow a task computing model. A task may be defined in accordance with appropriate parameters, for example, starting time, satellite ID, computing period, possibly antenna ID, etc. A scheduler or operation system may manage the tasks to run adaptively to achieve desired goals. Examples of such goals might include:

1. Time overlapping of loop-on periods of different satellites to achieve power savings.
2. Time-sharing the same correlator engine between different satellites to achieve circuitry savings.
3. Blocking certain time periods for satellite receiving to combat impulsive interference.
4. Time-sharing the same correlator engine between different antennas to achieve antenna diversity.

Figure 11:
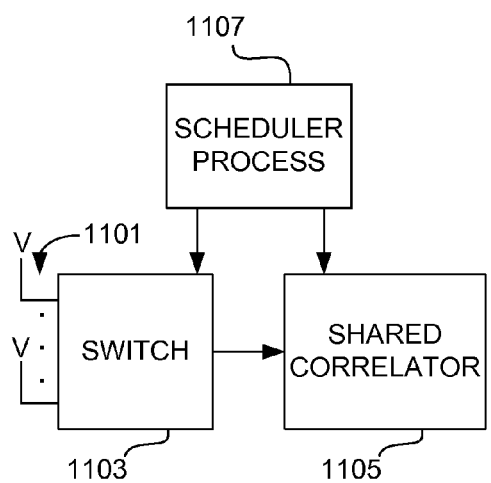
FIG. 11 is another diagram of GPS receiver hardware.

Referring to FIG. 11, a block diagram is shown of a portion of a GPS receiver in accordance with an exemplary embodiment. A plurality of antennas 1101 are coupled through a switch 1103 to shared correlator circuitry 1105. A scheduler process or processor 1107 is configured to control the switch 1103 and the correlator circuitry 1105. The scheduler 1107 may control time-sharing of the same correlator circuitry 1105 between the different antennas 1101 to achieve antenna diversity.

Figure 13:
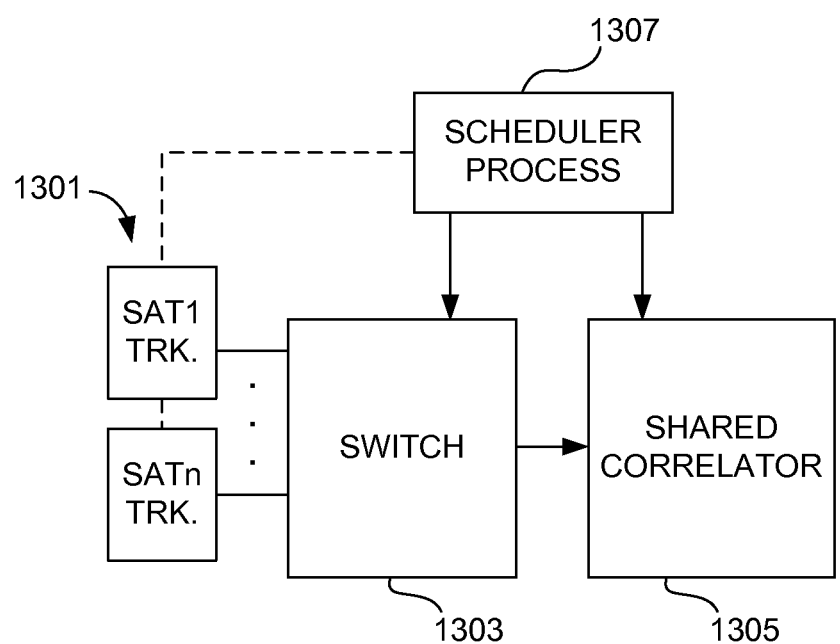
FIG. 13 is a further diagram of GPS receiver hardware.

Referring to FIG. 13, a block diagram is shown of a portion of a GPS receiver in accordance with an exemplary embodiment. A plurality of antennas included in satellite tracking units 1301, SAT1 TRK through SATn TRK., are coupled through a switch 1303 (which may be a logical switch) to shared correlator circuitry 1305. (That is, each satellite tracking unit may include an antenna). A scheduler process or processor 1307 is configured to control the switch 1303 and the correlator circuitry 1305. The scheduler 1307 may control time-sharing the same correlator circuitry 1305 between different satellites to achieve circuitry savings. In one embodiment, the scheduler 1307 may implement time-sharing by configuring a plurality of time intervals.

Time allocations for time-sharing of the correlation circuitry 1305 may be determined in accordance with GPS signal properties. A state of at least a portion of the correlator circuitry 1305 may be reset in correspondence to a transition from a task for tracking one satellite to a task for tracking another satellite. Resetting the state of at least a portion of the correlator circuitry 1305 may be achieved by determining a state of the portion of the correlator circuit 1305 that would have been expected had there been no time-sharing; and resetting the state of the portion of the correlator circuit 1305 to a state based on the state that would have been expected.

By way of example and not limitation, during a first time interval, the scheduler processor 1307 may configure switch 1303 to use a first satellite tracking unit 1301 and the correlator circuit 1305 to track a first satellite. Then, during a second time interval, the scheduler processor 1307 may configure switch 1303 to use a second satellite tracking unit 1301 and the correlator circuit 1305 to track a second satellite. During the second time interval, a portion of the correlator circuit 1305 may be reset to enable the processing within the correlator circuit to more easily accept new data from the second satellite tracking unit 1301.

The foregoing description has focused on methods of operating GPS receivers to ensure continuity of function during power cycling. Other embodiments of the application include GPS receivers designed or programmed to operate in the described manner. By ensuring continuity of function during power cycling, battery life of a GPS receiver may be prolonged without adversely impacting the user experience.

APPENDIX 1

Ideal Delay for Zero PRN_CHIP_PHASE after N TME Periods
The time computation here involves two time periods. One is TME period and the other is C/A PRN code cycle for a particular satellite. The time in GML correlator can be measured in M_CLK which is about 16MHz. Thus,
    TME_period = (TME2/2)*1/M_CLK (sec)
    CA_period = (2^34)/prn_freq*1023*1/M_CLK (sec)
where prn_freq is the register value in CH_PRN_FREQ and the chip frequency in Hz can be expressed using prn_freq by
    PRN_chip_freq = prn_freq/(2^32)*M_CLK/4 (Hz).
Here denote T as the time from the logged TME epoch to the zero PRN_CHIP_PHASE after N TME periods. T can be expressed as
    T = (1023 - logged_PRN_CHIP_PHASE)/PRN_chip_freq +
        X*CA_period(sec),
where X is integer number which counts how many C/A code cycle has passed. Then
    Ideal_delay = T - TME_period*N (sec), and Ideal_delay > 0.
In summary, we need to find the smallest integer X to satisfy the inequality
    Ideal_delay = (1023 - logged_PRN_CHIP_PHASE)/PRN_chip_freq
        +X*CA_period - TME_period*N > 0.
From Ideal Delay to Setter Setting
The setter starts to count down at TME epoch after it is configured. Its counting clock is at M_CLK/16~= 1MHz. To apply the setter delay, the above computed
'Ideal_delay' need first to fill an integer number (K) of (M_CLK/16) clock cycles and the residual part is configured in the PRN NCO (see FIG. 10).
    Ideal_delay = K*(16/M_CLK) - PRN_PHASE/PRN_chip_freq.
K and PRN_PHASE are computed as
    Ideal_delay = Int_delay*(16/M_CLK) + Fractional_delay APPENDIX 1-continued = (Int_delay + 1) *(16/M_CLK) - (16/M_CLK - Fractional_delay).
then,
  K = Int_delay+1 and PRN_PHASE = (16/M_CLK - Fractional_delay)*PRN_chip_freq.
Besides, there is an extra M_CLK/64 hardware delay when PRN_PHASE is applied in the PRN NCO. This delay need to be taken into account when computing the 'Ideal_delay'.

What is claimed is:

1. A method of operating a Global Positioning System (GPS) receiver comprising an RF section and a digital section, the digital section comprising correlator circuitry for performing correlation with respect to a plurality of satellite channels, the method comprising:
    cycling power to the RF and digital sections on and off according to a determined duty cycle having an ON portion and an OFF portion;
    during the ON portion, sampling data received from the plurality of satellite channels; and
    resetting a state of at least a portion of the correlator circuitry in correspondence to a transition from the OFF portion to the ON portion, wherein resetting the state of at least a portion of the correlator circuitry comprises:
    determining a state of the portion of the correlator circuitry that would have been expected at a point in time following the OFF portion; and
    resetting the state of the portion of the correlator circuitry to a state based on the state that would have been expected.

2. The method of claim 1, further comprising:
    ceasing at least some data processing during the OFF portion and resuming said data processing during the ON portion.

3. The method of claim 2, wherein the ceasing comprises disabling bit extraction and message processing.

4. The method of claim 2, wherein the resuming comprises resetting time-of-week data to account for the OFF portion.

5. A method of operating a Global Positioning System (GPS) receiver comprising an RF section and a digital section, the digital section comprising correlator circuitry for performing correlation with respect to a plurality of satellite channels, the method comprising:
    cycling power to the RF and digital sections on and off according to a determined duty cycle having an ON portion and an OFF portion;
    during the ON portion, sampling data received from the plurality of satellite channels, wherein the digital section comprises a data processing FIFO, wherein the data processing FIFO comprises flushing the data processing FIFO in correspondence with the OFF portion; and
    setting bits of selected words within the data processing FIFO to identify them as lost words that do not contain valid data.

6. A method of operating a Global Positioning System (GPS) receiver comprising an RF section and a digital section, the digital section comprising correlator circuitry for performing correlation with respect to a plurality of satellite channels, the method comprising:
    cycling power to the RF and digital sections on and off according to a determined duty cycle having an ON portion and an OFF portion;
    during the ON portion, sampling data received from the plurality of satellite channels;
    ceasing at least some data processing during the OFF portion and resuming said data processing during the ON portion; and
    resetting a parity error counter in the digital section in correspondence with the OFF portion.

7. A non-transitory computer-readable medium comprising instructions for operating a Global Positioning System (GPS) receiver comprising an RF section and a digital section, the digital section comprising correlator circuitry for performing correlation with respect to a plurality of satellite channels, the instructions comprising instructions for:
    cycling power to the RF section on and off according to a determined duty cycle having an ON portion and an OFF portion;
    during the ON portion, sampling data received from the plurality of satellite channels; and
    resetting a state of at least a portion of the correlator circuitry in correspondence to a transition from the OFF portion to the ON portion, wherein the instructions for resetting the state of at least a portion of the correlator circuitry comprise instructions for:
    determining a state of the portion of the correlator circuitry that would have been expected at a point in time following the OFF portion; and
    resetting the state of the portion of the correlator circuitry to a state based on the state that would have been expected.

8. A Global Positioning System (GPS) receiver comprising:
    an RF section;
    a digital section comprising:
        processor circuitry;
        memory coupled to the processor circuitry; and
        correlator circuitry coupled to the processor circuitry,
    wherein the memory and the processor circuitry are to provide a time-shared tracking mode in which the correlator circuitry is time shared between tasks for tracking a plurality of different satellites, wherein the memory and the processor circuitry are to reset a state of at least a portion of the correlator circuitry in correspondence to a transition from a task for tracking one satellite to a task for tracking another satellite, and wherein the memory and the processor circuitry are to reset the state of at least a portion of the correlator circuitry by:
        determining a state of the portion of the correlator circuitry that would have been expected had there been no time-sharing; and
        resetting the state of the portion of the correlator circuitry to a state based on the state that would have been expected.

9. The GPS receiver of claim 8, wherein the memory and the processor circuitry are to determine time allocations for time-sharing of the correlator circuitry in accordance with GPS signal properties.

* * * * *